Sept. 2, 1958 F. A. HILL 2,850,643
APPARATUS FOR MEASURING RADIOACTIVITY
Filed July 22, 1954 3 Sheets-Sheet 1

FIG. 1.

FRANK A. HILL,
INVENTOR.

BY
ATTORNEY

Sept. 2, 1958 F. A. HILL 2,850,643
APPARATUS FOR MEASURING RADIOACTIVITY
Filed July 22, 1954 3 Sheets-Sheet 2

FRANK A. HILL,
INVENTOR.

BY
ATTORNEY

Sept. 2, 1958　　　　　　F. A. HILL　　　　　　2,850,643
APPARATUS FOR MEASURING RADIOACTIVITY
Filed July 22, 1954　　　　　　　　　　　3 Sheets-Sheet 3

*Fig. 4.*

FRANK A. HILL,
INVENTOR.

BY

ATTORNEY

United States Patent Office 2,850,643
Patented Sept. 2, 1958

2,850,643

APPARATUS FOR MEASURING RADIOACTIVITY

Frank A. Hill, Van Nuys, Calif., assignor to Librascope, Incorporated, Glendale, Calif., a corporation of California Application July 22, 1954, Serial No. 444,955

19 Claims. (Cl. 250—83.6)

This invention relates to detecting apparatus and more particularly to apparatus for detecting the intensity of radioactivity.

In the past few years, considerable advances have been made in adapting the principles of atomic and nuclear energy for use in various fields. For example, great strides have been made in proving that nuclear energy can be efficiently used in power plants to generate power and electricity. Furthermore, efforts are being successfully made to build power plants for providing locomotion to such moving bodies as surface ships and submarines. And the principles of atomic and nuclear energy have been effectively adapted for such industrial uses as the detection of leaks and the detection of flaws in manufactured products.

It is well known that the use of atomic and nuclear materials presents problems of health and safety. Exposure to these materials may produce pathological changes in the human body without any appreciation by a person, either that he has been exposed or that he is being harmed, until a time when it is too late to help him. With the increasing adaptation of the principles of atomic energy to a wide variety of uses, it is becoming even more important to provide adequate safeguards which will indicate instantly to a person that he is receiving an excessive exposure.

In order for radiation-detecting apparatus to be satisfactory, it must meet several prerequisites. It must be light and portable so that it can be easily carried by a person as he moves around in his activities or duties. It must be compact so that it can be carried around conveniently. It must operate reliably even after exposure to radioactivity, since radioactivity sometimes seems to change the operating characteristics of components. It must be inexpensive in order to be available to a broad category of people who may be exposed to radioactivity either in peace or war. And it should operate on a self-sufficient basis without any necessity for receiving power from any external voltage supply.

A relatively large number of attempts have been made to provide satisfactory equipment for instantly detecting and indicating different intensities of radioactivity, but none of these attempts has been entirely satisfactory. The equipment has been either expensive or it has not operated reliably, especially after subjection to radiation. Furthermore, in many designs, it has been difficult to duplicate the operating characteristics from one production model to the next, since the designs have required the use of costly precision components.

This invention provides apparatus which overcomes the above difficulties. The apparatus is self-sufficient and is light and compact enough to be carried in the palm of a person's hand. The apparatus does not require the use of any precision components and utilizes a minimum number of components. For these reasons, the apparatus can be easily and economically duplicated. The apparatus functions reliably even after exposure to considerable doses of radiation.

The apparatus includes a Geiger tube for receiving radioactive emanations and for producing corresponding signals. A voltage having a maximum value for low intensities of radioactivity and having a decreasing value with increasing intensities of radioactivity is applied to the Geiger tube. In this way, the Geiger tube is provided with an optimum gain for low intensities of radioactivity so as to produce an expanded scale in this region to facilitate accurate readings. Components are also included to prevent the voltage from exceeding the maximum value, since these excessive voltages might permanently impair the Geiger tube or permanently alter its operating characteristics.

The signals produced by the Geiger tube charge a capacitance and produce a voltage across the capacitance. When the voltage across the capacitance exceeds a particular value, a neon tube connected to the capacitance breaks down to provide a low impedance and the capacitance discharges through an inductance and a meter. During this discharge, the inductance receives energy from the capacitance.

Upon a reduction in the voltage across the capacitance to the desired value, the capacitance stops discharging and the energy stored in the inductance becomes suddenly released. This causes a relatively large current to flow through the meter so as to provide a good indication as to the intensity of radioactivity. By providing the inductance with saturable characteristics for increasing intensities of radioactivity, the meter scale can be further expanded for low readings to improve the accuracy of these readings. In this way, a scale approximating logarithmic calibrations can be provided.

An object of this invention is to improve apparatus for detecting the intensity of radioactivity.

Another object is to provide a light, compact and inexpensive detector whose operating characteristics can be easily duplicated on a mass production basis.

A further object is to utilize components of conventional value and to eliminate the necessity for any precision components.

Still another object is to provide an increased gain for low intensities of radioactivity relative to the gain at high intensities to expand the meter scale at the low end for improved accuracy in meter readings.

A still further object is to amplify the signal applied to a meter by using a minimum number of components so as to produce an enhanced accuracy in the meter readings.

Still another object is to utilize a Geiger tube and to provide components for preventing the voltage applied to the tube from ever exceeding a safe value and for preventing any of the components from becoming subjected to voltages or forces which might damage or impair the operation of the apparatus.

Other objects and advantages will be apparent from a detailed description of the invention and from the appended drawings and claims.

Figure 1:
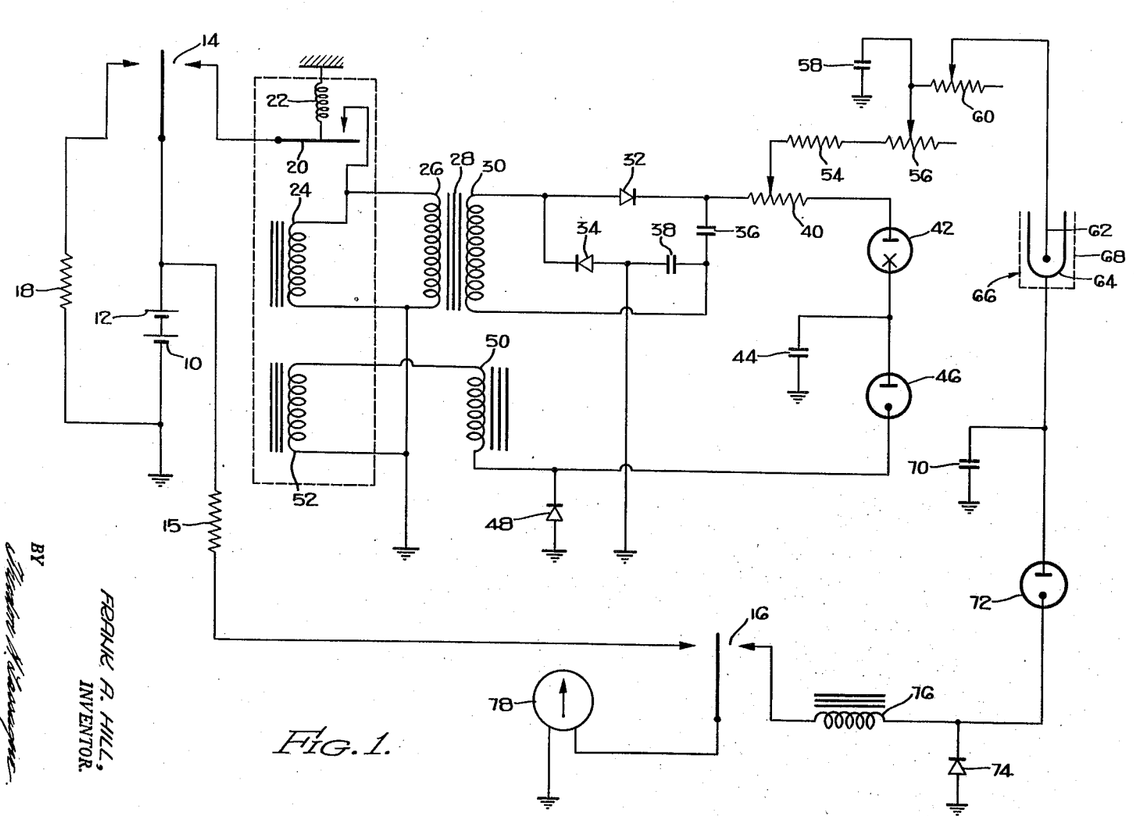
Figure 1 is a circuit diagram schematically illustrating one embodiment of the invention.

In the embodiment of the invention shown in Figure 1, a suitable source of direct voltage such as a dry cell or a plurality of dry cells is provided. Specifically, a pair of dry cells 10 and 12 are shown as being connected in series, with the negative terminal of the cell 10 being grounded.

The cells 10 and 12 are adapted to deliver a few volts. The positive terminal of the cell 12 is connected to the movable contact of a single-pole, double-throw switch 14 and through a resistance 15 to the left stationary contact in a single-pole, double-throw switch 16. The resistance 15 may have a value of approximately 3900 ohms.

Connections are made from the left stationary contact of the switch 14 to a grounded resistance 18 having a value of approximately 10 ohms, and from the right stationary contact of the switch 14 to the movable contact of a relay 20. The relay 20 may be an Edison sensitive relay designated as Number 219–CK–K–S, in which the movable contact has a very low mechanical inertia, low friction losses and a high sensitivity. A spring 22 is adapted to act on the movable contact of the relay 20 in a direction to close the relay.

One terminal of a relay winding 24 is connected to the stationary contact of the relay 20 and the other terminal of the winding 24 is grounded. The winding 24 is adapted when energized to produce magnetic flux in a direction to open the contacts of relay 20. The primary winding 26 of a transformer 28 is in parallel with the relay winding 24, and a secondary winding 30 is wound on the primary winding 26. The primary winding 26 may be formed from approximately 90 turns of No. 24 wire and the secondary winding 30 may be formed from approximately 30,000 turns of No. 42 wire.

The plate of a diode 32 and the cathode of a diode 34 are connected to the upper terminal of the winding 30, as seen in Figure 1. The diodes 32 and 34 may be selenium rectifiers, such as U50 HP rectifiers manufactured by the International Rectifier Corporation. A pair of capacitances 36 and 38 are in series between the cathode of the diode 32 and the grounded plate of the diode 34. The capacitances 36 and 38 may have values of approximately 0.02 microfarads and potential ratings of approximately 600 volts. The common terminal between the capacitances 36 and 38 is connected to the lower terminal of the secondary winding 30 as seen in Figure 1.

A potentiometer 40, a voltage regular tube 42 and a capacitance 44 are in series between the cathode of the diode 32 and ground. The potentiometer 40 may have a value such as 1 megohm and the capacitance 44 may have a value such as 800 micro microfarads and a voltage rating of 500 volts. The voltage regulator tube 42 may be similar to that designated by the Victoreen Instrument Company as VR 5950, and having a regulating potential of approximately 700 volts.

One terminal of a neon tube 46 such as that designated by the General Electric Company as NE-2 is connected to the common terminal between the voltage regular tube 42 and the capacitance 44. The cathode of a diode 48 is connected to the other terminal of the neon tube 46 and the plate of the diode is grounded. The diode 48 may be similar to that designated as IN–93 by the General Electric Company, or as IN–90 by the Hughes Aircraft Company.

A series combination of an inductance 50 and a relay winding 52 is in parallel with the diode 48. The inductance 50 may be formed from approximately 30,000 turns of wire wound on a toroidal mumetal core or a toroidal Permalloy No. 5515 core made by the Arnold Engineering Company. The winding 52 is adapted when energized to act on the relay 20 in a direction to oppose the spring 22.

A resistance 54, a rheostat 56 and a capacitance 58 are in series between the movable contact of the potentiometer 40 and ground. The resistance 54 has a value of approximately 10 megohms, and the rheostat 56 has a maximum value of approximately 10 megohms. The capacitance 58 has a value such as 0.01 microfarads and a potential rating of approximately 1,000 volts.

One terminal of a rheostat 60 having a maximum value of 100,000 ohms is connected to the ungrounded terminal of the capacitance 58. The other terminal of the rheostat 60 is connected to a rod 62 axially disposed within a conductive cylinder 64 in insulated relationship to the cylinder. A suitable gas such as argon is retained under pressure within the cylinder. The rod 62 and the cylinder 64 form a Geiger tube, generally indicated at 66. The Geiger tube 66 may be similar to that designated as CK–1035 by the Raytheon Manufacturing Company. A lead shield of a suitable thickness such as 0.079 inch, and indicated in broken lines at 68, may be disposed in spaced, enveloping relationship to the cylinder 66.

A capacitance 70 is connected between the conductive cylinder 64 and ground. The capacitance 70 may have a value of approximately 0.01 microfarad and a potential rating of approximately 400 volts. One terminal of a neon tube 72 corresponding in construction and operating characteristics to the tube 46 is connected to the ungrounded terminal of the capacitance 70. The other terminal of the neon tube 72 is connected to the cathode of a diode 74 having its plate grounded. The diode 74 corresponds in construction and operating characteristics to the diode 48 disclosed above.

An inductance 76 corresponding substantially in construction to the inductance 50 has common terminals with the cathode of the diode 74 and the right stationary contact of the switch 16 as seen in Figure 1. As will be disclosed in detail hereinafter, the inductance 76 has saturable characteristics under certain conditions of operation in the system. The movable contact of the switch 16 is connected to one terminal of a meter 78, the other terminal of which is grounded. The meter 78 may be an ammeter having a range from 0 to 500 microamperes, and having a substantially logarithmic scale.

Because of the action of the spring 22 on the movable contact of the relay 20, the relay is normally closed. This causes current to flow through a circuit including the batteries 10 and 12, the movable contact and right stationary contact of the switch 14, the relay 20 and the relay winding 24 when the movable contact of the switch 14 is manually pivoted into engagement with the right stationary contact.

The flow of current through the relay winding 24 causes a magnetic flux to be produced of sufficient strength to overcome the action of the spring 22 and to open the relay 20. When the relay 20 becomes opened, current no longer is able to flow through the relay winding 24. This causes the action of the spring 22 to become predominant again so that the movable contact of the relay 20 is pivoted into engagement with the stationary contact of the relay. In this way, the relay 20 becomes opened and closed at a frequency largely dependent upon the characteristics of the spring 22.

Since the primary winding 26 of the transformer 28 is in parallel with the relay winding 24, the winding 26 alternately receives current and has it interrupted in accordance with the opening and closing of the relay 20. This interrupted current causes an alternating flux to be produced in the core of the transformer 28 for the induction of an alternating voltage in the primary winding 26 and the secondary winding 30.

The induction of alternating voltages in the transformer windings 26 and 30 is facilitated by the considerable inductance in the transformer. This inductance causes a surge of voltage to be induced in the windings 26 and 30 in an opposite direction to that produced by the closure of the relay 20. During this inverse surge of potential, a more positive potential is produced at the lower terminals of the transformer windings 26 and 30 than at the upper terminals of these windings.

When the upper terminal of the secondary winding 30 has a more positive voltage induced in it than the lower terminal of the winding, current flows through a circuit including the winding, the diode 32 and the capacitance 36. This current charges the capacitance 36 in a direction to produce a more positive potential at the upper terminal of the capacitance than at the lower terminal of the capacitance.

Upon the induction of a more positive voltage at the lower terminal of the secondary winding 30 than at the upper terminal of the winding, current flows through a circuit including the winding, the capacitance 38 and the diode 34. This current charges the capacitance 38 in a direction to produce a positive voltage on the right plate of the capacitance relative to the grounded potential on the left plate of the capacitance.

Since the upper plate of the capacitance 36 and the right plate of the capacitance 38 respectively have higher potentials than the lower plate of the capacitance 36 and the left plate of the capacitance 38, the potential across the two capacitances in series is approximately twice as great as the potential across each of the capacitances individually. This causes the winding 30, the diodes 32 and 34, and the capacitances 36 and 38 to act as a voltage doubler for increasing the voltage which would otherwise have been obtained.

The voltage obtained across the capacitances 36 and 38 produces a flow of current through a circuit including the capacitances, the potentiometer 40, the voltage regulator tube 42 and the capacitance 44. The current flowing through this circuit is subject to material fluctuations when the voltage across the capacitances 36 and 38 varies from a desired value. Considerable fluctuations in current are produced because of the sensitivity of the voltage regulator tube 42 to voltage changes. For example, the current increases considerably with relatively moderate increases in voltage across the capacitances 36 and 38.

For reasons which will become apparent hereinafter, the winding 30 is wound with a greater number of turns than that which would ordinarily be required to produce a particular voltage across the capacitances 36 and 38. This increased number of turns initially causes a greater voltage than that desired to be produced across the capacitances 36 and 38. The excess voltage in turn causes the current flowing through the voltage regulator tube 42 to increase. For example, the current may increase from a value of approximately 10 microamperes to a value as high as 30 microamperes.

The current flowing from the capacitances 36 and 38 through the voltage regulator tube 42 and the capacitance 44 charges the capacitance 44 to a value dependent upon the current flow. Since the current flowing from the capacitances 36 and 38 is initially high for the reasons disclosed above, the capacitance 44 initially becomes charged to a relatively high value.

During the time that the voltage across the capacitance 44 is below a particular value, the neon tube 46 has a high impedance and prevents the capacitance from discharging. When the capacitance 44 becomes charged to provide a voltage greater than the particular value, the neon tube breaks down and presents a low impedance. This causes the capacitance 44 to discharge through a circuit including the capacitance, the neon tube 46, the inductance 50 and the relay winding 52. The discharge current may be in the order of 10 microamperes.

The current flowing through the relay winding 52 from the capacitance 44 causes the winding to produce a magnetic flux which acts upon the movable contact of the relay 20. Since the current producing the magnetic flux in the winding 52 is in the order of only a few microamperes, the flux produced is not strong enough to open the relay. However, the flux partially counteracts the force exerted by the spring 22 and so affects the opening and closing characteristics of the relay 20. The relay characteristics are affected in a manner to reduce the frequency at which the relay opens and closes.

Upon a reduction in the frequency of operation of the relay 20, the alternating voltage induced in the secondary winding 30 becomes reduced. This reduction in the induced voltage causes the rectified voltage produced across the capacitances 36 and 38 to become correspondingly reduced. Since the rectified voltage is reduced, the current flowing from the capacitances 36 and 38 through the voltage regulator tube 42 and the capacitance 44 becomes correspondingly reduced.

As the current through the voltage regulator tube 42 and the capacitance 44 decreases to the desired value, the charge produced across the capacitance becomes correspondingly reduced. This causes the neon tube 46 to break down less frequently than formerly for the production of a low impedance. Since current flows from the capacitance 44 through the winding 52 only when the neon tube 46 has a low impedance, the winding 52 acts less often than formerly to adjust the frequency characteristics of the relay 20.

The reduced number of adjustments in the frequency characteristics of the relay 20 causes the relay to close more often than formerly. This in turn causes an alternating voltage of increased amplitude to be produced in the secondary winding 30, and a rectified voltage of increased magnitude to be produced across the capacitances 36 and 38. In this way, the opening and closing of the relay 20 is regulated in frequency to maintain the proper output voltage at the movable contact of the potentiometer 40. Since the output voltage is maintained substantially constant, the regulating current flowing through the tube 42 and the capacitance 44 is also maintained substantially constant.

The current flowing from the capacitance 44 through the relay winding 52 during the existence of a low impedance in the neon tube 46 also flows through the inductance 50. This current causes energy to be built up in the inductance 50 because of the inherent functioning of the inductance. Upon the interruption of the discharge current from the capacitance 44, the energy stored in the inductance 50 becomes suddenly released.

The release of energy in the inductance 50 produces a flow of current through a circuit including the inductance, the relay winding 52 and the diode 48. This current continues to flow until all of the energy stored in the inductance 50 becomes consumed as power losses in the circuit. As is well known, power losses in an electrical circuit can only occur in the resistive components of the different circuit members. Since the inductance 50, the relay winding 52 and the diode 48 all have relatively low values of resistance, the current flows for a relatively long time through the circuit including these members before the energy stored in the inductance 50 becomes finally consumed.

During the time that the energy stored in the inductance 50 produces a current through the relay winding 52 and the diode 48, the winding 52 produces a flux which acts in opposition to the spring 22 to change the frequency characteristics of the relay 20. As disclosed above, this change causes the relay 20 to open and close at a reduced frequency so that a reduced voltage is induced in the secondary winding 30 and a reduced voltage is produced across the capacitances 36 and 38. Since the inductance 50 increases the time during which the frequency characteristics of the relay 20 are adjusted, the inductance produces a reduction in the time required for the voltage across the capacitances 36 and 38 to return to their proper value. In this way, the inductance 50 facilitates the regulatory action of the system.

The inductance 50 not only facilitates the regulatory action of the system by extending the time during which the frequency characteristics of the relay 20 are changed, but also by producing an increased change in the frequency characteristics of the relay. This results from the increased current flowing through the relay winding 52 upon the release of energy from the inductance 50 relative to the current flowing through the winding from the capacitance 44. Since the current flowing through the winding 52 is increased, the frequency of opening and closing of the relay 20 is reduced, and the voltage induced in the secondary winding 30 is reduced. This causes the voltage across the capacitances 36 and 38 to return to its proper value in a reduced length of time.

As disclosed above, a substantially constant voltage is maintained across the capacitances 36 and 38, and this voltage is maintained by a substantially constant regulatory current flowing through the voltage regulator tube 42. This current remains constant even with considerable variations in input voltage, such as the voltage from the cells 10 and 12, and with considerable variations in output current. Since the current is in the order of only a few microamperes, the power dissipation in the regulatory circuits is relatively low. The construction, operation and advantages of the voltage control system disclosed above are fully disclosed in copending application, Serial Number 433,570, filed June 1, 1954 by me.

In order to provide a full understanding of the system shown in Figure 1, the operating characteristics of Geiger tubes in general, and the Geiger tube 66 in particular, will now be disclosed. When radioactive emanations such as gamma rays enter the tube 66, they strike molecules of gas such as argon in the tube with sufficient force to ionize the molecules into positive and negative particles. Each ray may strike several molecules with a sufficient force to produce positive and negative particles. The energy imparted to the charged particles is sufficient for these particles to ionize other molecules of gas when they strike the molecules.

The negatively charged particles produced in the Geiger tube 66 are attracted to the rod 62, because of the relatively large positive voltage on the rod. Since the negatively charged particles flow to the positive electrode in the Geiger tube 66, the positively charged particles flow to the negative electrode in the tube, this electrode being the cylinder 64. In this way, a current is produced in the Geiger tube. This current represents an amplification of the charges in the radioactive emanations impinging on the Geiger tube.

Figure 2:
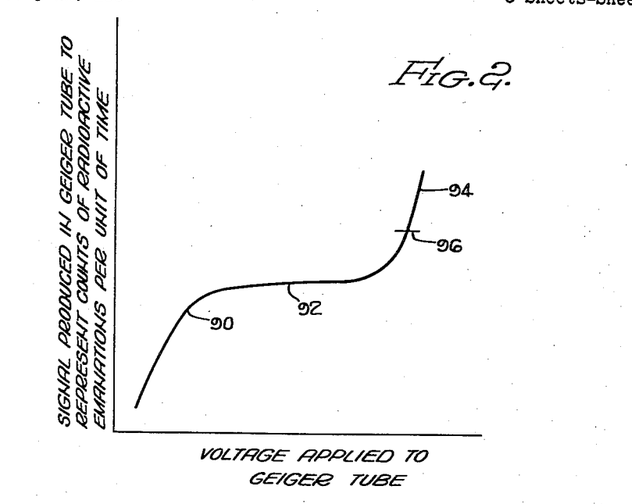
Figure 2 is a curve schematically illustrating the operation of one of the components shown in Figure 1.

As shown in Figure 2, the signal amplification produced in the Geiger tube 66 is dependent upon the voltage across the tube. When the voltage applied to the rod 62 is relatively low, the gain (i. e. coulombs per pulse) produced in the Geiger tube 66 is also relatively low. As the voltage across the Geiger tube increases towards a value such as 600 volts, the signal amplification produced in the tube increases substantially linearly. This is illustrated at 90 in Figure 2. The portion 90 of the curve shown in Figure 2 is commonly designated as the "Knee" of the curve by persons skilled in the art.

The gain of the Geiger tube 66 increases directly with further increases in the voltage applied to the rod 62 in the Geiger tube 66. This causes the current through the tube to be proportional to both radiation rate and voltage in the substantially flat portion 92, commonly known as the "plateau region" of the tube response. Further increases in voltage cause the tube 66 to produce a first signal similar to that produced in the region 92 upon the passage of each radioactive emanation into the tube, and also cause the tube to produce a number of signals after the first signal. Because of the plurality of signals, a portion 94 of tube response is produced. In this portion, the gain of the tube increases rapidly with increases in the voltage applied to the tube.

Since the Geiger tube 66 has a substantially stable response in the plateau region 92 to each radioactive emanation, this is, perhaps, the most desirable region in which to operate over most of the range of radioactive intensities. For low intensities of radioactivity, it may be desirable to operate at the beginning of the portion 94 so as to increase the sensitivity of tube response. For high intensities, it may be desirable to operate towards the top of the knee region 90, so as to dull the sensitivity of the tube and increase the range of measurements and so as to prevent overloading of other components in the apparatus. In any case, it is not desirable to operate too far up on the region 94 since the response characteristics of the Geiger tube may become permanently altered and the tube may even become irreparably damaged. However, in the halogen quench tube used, this possibility is somewhat remote.

As previously disclosed, a relatively constant voltage is produced across the capacitances 36 and 38 even with considerable variations in input voltage. The voltage across the capacitances 36 and 38 produces a flow of current through a circuit including the capacitances, the potentiometer 40, the resistance 54, the rheostat 56 and the capacitance 58. This current charges the capacitance 58 to a relatively high value such as approximately 700 volts. The voltage across the capacitance 58 is applied to the rod 62 in the Geiger tube 66 to make the tube operative.

When a radioactive emanation penetrates the tube 66, it produces a current in the tube in a manner similar to that disclosed above. This current flows through a circuit including the capacitance 58, the rheostat 60, the Geiger tube 66 and the capacitance 70. The current tends to discharge the capacitance 58 and to charge the capacitance 70. The tendency for the capacitance 58 to discharge is compensated at least partially by the charging current flowing through the capacitance from the capacitances 36 and 38.

During the time that substantially no radioactive emanations pass into the Geirger tube 66, the Geiger tube has a voltage introduced to it from the capacitance 58 corresponding to a voltage indicated at 96 in Figure 2. As will be seen, this voltage occurs at the beginning of the region 94 in Figure 2 where the tube is still operating in the safe region, but is providing a large signal amplification.

Upon the penetration of radioactive emanations at a low rate, the Geiger tube 66 produces signals which cause the capacitance 58 to discharge at a low rate into the capacitance 70. Since the capacitance 58 is discharging at a low rate, only a relatively small current is required from the capacitances 36 and 38 to replenish the capacitance 58. This current produces only small voltage drops across the resistance 54 and the rheostat 56, so that the voltage across the capacitance 58 remains substantially constant.

Since the capacitance 58 is substantially independent of the capacitances 36 and 38 and the resistive members 54 and 56 for low intensities of radioactivity, substantially the only variations in the voltage applied to the Geiger tube 66 result from voltage drops across the rheostat 60. These variations in voltage produce a decrease in the voltage applied to the Geiger tube 66 as the intensity of radioactivity gradually increases. The decreases in voltage produce a corresponding decrease in the signal gain provided by the Geiger tube 66, as may be seen by the portion 94 in Figure 2. In this way, the value of the rheostat 60 affects the charge flowing from the capacitance 58 to the capacitance 70 for low intensities of radioactivity.

For intermediate intensities of radioactivity, the voltage applied to the rod 62 in the Geiger tube 66 decreases sufficiently so that the tube operates in the plateau region 92. During the operation of the Geiger tube 66 in the plateau region, the voltage applied to the rod 62 in the Geiger tube decreases with increases in the number of radioactive emanations penetrating the Geiger tube and proportionately reduces the amplification of the tube.

This results in part from the voltage drop across the resistance 60 and in part from the increasing inability of the capacitances 36 and 38 to replenish the charge being withdrawn from the capacitance 58.

When the intensity of radioactive emanations become relatively high, pulses of current are produced at relatively frequent intervals in the Geiger tube 66. Each pulse of current flows through the circuit including the capacitance 58, the rheostat 60, the tube 66 and the capacitance 70 and produces a corresponding discharge of the capacitance 58 into the capacitance 70. Because of the values of the capacitance 58, the resistive members 54 and 56 and the capacitances 36 and 38, the current flowing into the capacitance 58 to replenish the charge in the capacitance is relatively limited. This limited current prevents the charge in the capacitance 58 from being fully replenished when the intensity of radioactivity is relatively high. As a result, the voltage across the capacitance 58 decreases with increases in the intensity of radioactivity when the intensity of radioactivity is relatively high.

For high intensities of radioactivity, the voltage applied to the rod 62 in the Geiger tube 66 becomes sufficiently low to produce an operation of the tube in the knee portion 90 shown in Figure 2 at a position just below the plateau region 92. In this region, the gain produced by the Geiger tube is not as high as it is in the plateau region 92 and in the region 94. Since the gain provided by the tube 66 varies considerably with voltage in the knee portion 90, the gain in the tube decreases as the intensity of radioactivity increases at high values of intensity.

Figure 4:
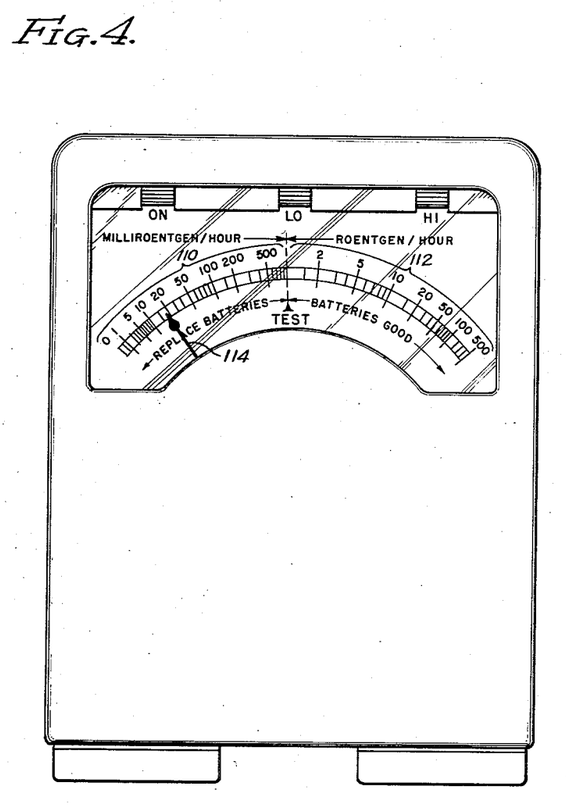
Figure 4 is a diagram disclosing the indiator and scale of the embodiment of Figure 1.

The decrease in gain at high intensities of radioactivity permits the scale at low and intermediate intensities of radioactivity to be expanded to fill the space made available by the restriction of the scale at high intensities of radioactivity. Figure 4 shows the expansion of the scale 110 at low and intermediate intensities of radioactivity. This expansion of the scale is desirable to minimize errors in reading. The contraction of the scale 112 is also shown in Figure 4. This contraction of the scale at high intensities of radioactivity does not produce any appreciable error in reading. A pointer 114 indicates the point on the scale which is to be read.

The desirability of altering scale characteristics as disclosed above can be seen by a particular example. An error of approximately 10% is produced when 100 milliroentgens/hour are read instead of the true value of 90 milliroentgens/hour, but this difference in scale positions can be hardly detected in a linear scale having a range of 50,000 milliroentgens/hour. However, a reading of 10,000 milliroentgens/hour instead of 10,200 milliroentgens/hour produces an error of only 2%. In a linear scale, such a difference in reading could be relatively easily detected.

It should be appreciated that the voltage applied to the rod 62 in the Geiger tube 66 is largely controlled by the value of the rheostat 60 at low intensities of radioactivity. Because of the voltage drop across the rheostat, the value of the rheostat 60 can be varied by adjusting the positioning of the movable contact in the rheostat. At high intensities of radioactivity, the voltage applied to the rod 62 in the Geiger tube 66 is largely controlled by the values of the resistance 54 and the rheostat 56. The reason is that the resistive members 54 and 56 limit the current flowing from the capacitances 36 and 38 to replenish the charge in the capacitance 58. The value of the resistive members 54 and 56 can be varied by adjusting the positioning of the movable contact on the rheostat 56.

The relative intensity at which the resistive members 54 and 56 become more important than the rheostat 60 in controlling the voltage applied to the Geiger tube 66 is dependent upon the value of the capacitance 58. For example, if the value of the capacitance is increased, the capacitance is able to receive an increased amount of charge. In this way, the voltage across the capacitance is not as affected by losses of charge which occur when current pulses are produced in the Geiger tube. It will thus be seen that increases in the value of the capacitance 58 cause the resistive members 54 and 56 to take over control of the voltage applied to the Geiger tube at higher intensities of radioactivity than formerly.

Since the current flowing through the Geiger tube 66 and the capacitance 70 has a value dependent upon the intensity of radioactivity, the capacitance 70 becomes charged to a value dependent upon such intensity. During the time that the charge in the capacitance 70 is less than a particular value, the neon tube 72 presents a relatively high impedance. This high impedance effectively operates to prevent the capacitance 70 from discharging through the neon tube and components connected to the neon tube.

When the voltage across the capacitance exceeds the particular value, the neon tube 72 breaks down and presents a relatively low impedance. The particular value at which the neon tube 72 breaks down occurs at a relatively low intensity of radiation, such as approximately 50 milliroentgens. Upon the breakdown of the neon tube 72 to present a low impedance, the capacitance 70 starts to discharge through a circuit including the capacitance, the neon tube 72, the inductance 76, the right stationary and movable contacts of the manually operated switch 16 and the meter 78. The current flowing through this circuit is in the approximate range of 0 to 20 microamperes average, but with a peak current of approximately one milliampere.

During the time that the capacitance 70 is discharging through the inductance 76, the inductance receives energy. This results from the fact that inductances serve as energy storage devices, as disclosed above. The amount of energy received by the inductance is dependent upon the amplitude and duration of the discharge current flowing from the capacitance 70. These factors are in turn dependent upon the intensity of radioactivity, as disclosed above.

Upon the interruption of the current from the capacitance 70, the energy stored in the inductance 76 is released. This causes current to flow through a circuit including the inductance 76, the right stationary and movable contacts of the switch 16, the meter 78 and the diode 74. The current flowing through this circuit is relatively great in comparison to the discharge current flowing from the capacitance 70. For example, the current flowing through the meter 78 upon the release of energy from the inductance 76 has an approximate range of 0 to 500 microamperes when the range of the discharge current flowing from the capacitance 70 is approximately 0 to 20 microamperes.

Current flows through the circuit including the inductance 76, the meter 78 and the diode 74 until all of the energy in the inductance has been consumed as power losses in the circuit. These power losses occur in the resistive components of the inductance 76, the meter 78 and the diode 74. Since the resistive components of these members are relatively low, current flows through the circuit for a relatively long time before all of the energy in the inductance 76 becomes consumed. The long length of time required for the full release of energy from the inductance 76 produces a stable indication by the meter 78.

The value of the current flowing through the meter 78 upon the release of energy from the inductance 76 is dependent upon the energy stored in the inductance. Since the energy stored in the inductance is dependent upon the intensity of radioactivity as previously disclosed, the meter 78 provides an indication of the intensity of radiation. The indication provided by the meter 78 not only has an increased stability as a result of the action of the inductance 76, but also an increased accuracy and reliability.

This results from the action of the inductance 76 in producing a considerably magnified current through the meter 78 upon the release of the energy in the inductance.

The inductance 76 also serves another important function. This results from the fact that at high intensities of radioactivity the capacitance 70 becomes charged at a greater rate because of the increased currents flowing through the Geiger tube 66. This causes the neon tube 72 to break down more frequently and causes a substantially greater flux level to be produced in the inductance 76. As may be seen by the hysteresis curve shown in Figure 3, the magnitude of the voltage applied to an inductance such as the inductance 76 and the amount of time for the application of such voltage determine the saturation of the ferromagnetic core in the inductance. Saturation of the core occurs when increased currents flowing through the inductance produce little or no increase in the energy stored in the core. Upon the saturation of the core in the inductance 76, further increase in the rate of application of pulses of voltage actually produces a significant decrease in the time during which the meter current is supplied from the inductance 76 instead of from the neon tube 72. The saturable region of the core in the inductance 76 is illustrated at 100 in Figure 3.

Figure 3:
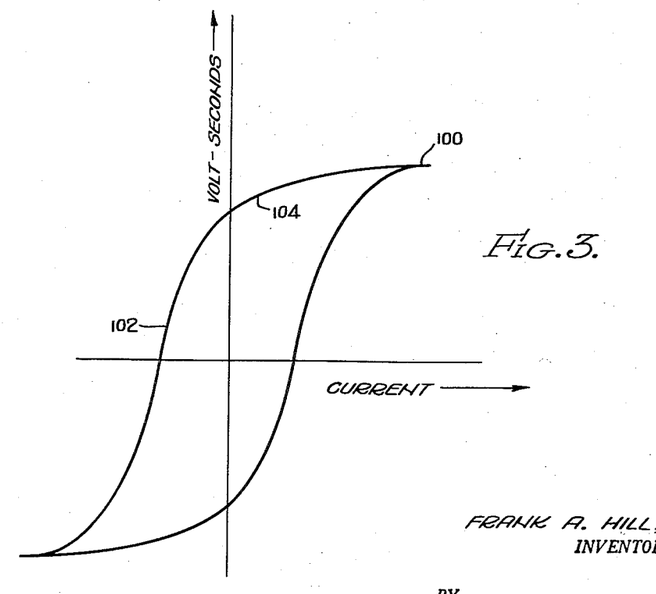
Figure 3 is a curve schematically illustrating the operation of another of the components shown in Figure 1.

For low and intermediate intensities of radioactivity, the inductance 76 operates in a substantially linear region of the hysteresis curve shown in Figure 3. This region is illustrated at 102 in Figure 3. In this region, the amount of energy stored in the core increases in somewhat linear manner with the magnitude and duration of the voltage applied to the core. At high intensities of radioactivity such as those approaching 50 roentgens per hour, the inductance 76 operates in a region indicated at 104 in Figure 3. In this region, the energy stored in the core still increases with increases in radioactivity, but at a relatively slow rate in comparison to the energy gains in the region 102 for corresponding increments in the intensity of radioactivity.

Since the energy stored in the inductance 76 controls the current flowing through the meter 78 and the deflection of the pointer in the meter, the indications provided by the meter become relatively flattened at high intensities of radioactivity. As disclosed above, this is desirable since expansion of the low and intermediate scale portions produce increased accuracies in readings, but contraction of the high scale portions do not produce any appreciable increases in the inaccuracy of reading.

It has been disclosed above that the inductance 76 operates on the curve shown in Figure 3 at a position dependent upon the magnitude and duration of the voltage applied to it. The magnitude and duration of the voltage applied to the inductance are in turn dependent upon the charge in the capacitance 70 at the time that the neon tube 72 conducts. The charge in the capacitance 70 can be controlled by varying the value of the capacitance. The charge of voltage across the capacitance is of course dependent upon the firing and extinguishing voltages of the neon tube 72.

The control which can be provided by properly choosing the value of the capacitance 70 will be seen from the following discussion. When the value of the capacitance 70 is relatively low, it has a relatively high impedance. At low intensities of radioactivity, the inductance 76 also has a high impedance since it is not at all saturated for such radiation intensities. The high impedances of the capacitance 70 and the inductance 76 cause these members to provide a good impedance match for each other at low intensities of radioactivity. This good impedance match causes an optimum or maximum power transfer to be obtained from the Geiger tube 66 to the coil of the meter 78. As a result, the meter 78 is quite sensitive to changes in intensity of radioactivity at low values of intensity.

At high intensities of radioactivity, the inductance 76 presents a relatively low impedance because of its tendency to become saturated, as disclosed above. However, the low value of the capacitance 76 causes the capacitance to present a high impedance. This mismatch in impedances causes a relatively poor transfer of power to take place from the Geiger tube 66 to the coil of the meter 78. This causes the meter 78 to be somewhat insensitive to changes in the intensity of radioactivity at low values of intensity.

When the capacitance 70 has a large value, it presents a relatively low impedance. This causes a mismatch in impedances to be produced between the capacitance 70 and the inductance 76 at low intensities of radioactivity. Conversely, at high intensities of radioactivities, a match in impedances between the capacitance 70 and the inductance 76 is obtained.

It will be seen that a low value for the capacitance 70 is more desirable than a high value for the capacitance. By providing a low value for the capacitance, a good response is produced at low intensities of radioactivity such that the scale on the meter 78 can be expanded at these intensities. At high intensities, the poor match in impedances causes the scale to be somewhat contracted.

For a proper value of the capacitance 70, the mismatch in impedances at high intensities of radioactivity is such that only slight increases in current are produced through the inductance 76 as the intensity of radioactivity increases above the full scale reading of 50 roentgens/hour. Such slight increases in current cause the energy stored in the inductance 76 to increase slightly. However, they are not sufficiently great to produce a saturation of the inductance.

Since the energy stored in the inductance increases slightly with increases in radioactivity beyond a full scale reading of 50 roentgens/hour, the pointer in the meter 78 is deflected to the high end of the scale at a position past the calibrated indications on the scale. This indicates that the intensity of radioactivity is greater than 50 roentgens/hour. However, the pointer in the meter 78 is not so strongly actuated as to become damaged or impaired in calibration, even when it is maintained at the high end of the scale for long periods of time.

As disclosed above, the cells 10 and 12 are preferably dry cells, since dry cells offer advantages of compactness and light weight. However, dry cells tend to run down occasionally. In order to test the dry cells 10 and 12, the movable contacts of the switches 14 and 16 are pivoted into engagement with their left stationary contacts. This causes a relatively small current to flow through a circuit including the dry cells 10 and 12, the resistance 15, the left stationary and movable contacts of the switch 16, and the meter 78. The resultant deflection produced on the pointer of the meter 78 provides an indication of the calibration of the dry cells 10 and 12.

At the same time that current flows through the resistance 15 and the meter 78, current also flows from the dry cells 10 and 12 through the resistance 18. The current flowing through the resistance 18 is considerably greater than the current flowing through the resistance 15 and the meter 78. This heavy flow of current causes the voltage across the dry cells to drop quickly to its true loaded value. If the resistance 18 were not included, the voltage across the dry cells might remain at a relatively high and false value, because of the small current flowing through the resistance 15 and the meter 78.

The apparatus disclosed above has several important advantages. It provides reliable indications as to the intensity of radioactivity over a relatively wide range of values. It utilizes a minimum number of components, all of them inexpensive and none of them critical in value or manufacturing operations, to produce such reliable indications. The apparatus operates inherently to provide indications approaching a logarithmic calibration in which the indications at the low end of the scale are expanded and the indications at the high end of the scale are contracted. And it includes features for preventing any of the components including the Geiger tube and the meter from ever being subjected to excessive voltages which might permanently damage the components or at least alter or impair their operating characteristics.

I claim:

1. In combination, means for receiving radioactive emanations and for producing signals in accordance with the radioactive emanations, means for applying to the receiving means a voltage dependent upon the rate of radioactive emanations to vary the response of the receiving means in accordance with the rate of radioactive emanations, an indicator, means for producing a current through the indicator upon the occurrence of radioactive emanations greater than a particular intensity and in accordance with the intensity of such emanations, and means for amplifying the current through the indicator to provide a relatively strong indication by the indicator.

2. In combination, a Geiger tube for receiving radioactive emanations and for producing signals in accordance with the radioactive emanations, means for applying to the Geiger tube a voltage dependent upon the intensity of radioactivity to vary the response of the tube in accordance with the intensity of radioactivity, a first storage member for receiving energy from the Geiger tube in accordance with the signals produced by the tube, a second storage member for receiving energy from the first storage member during the storage of energy greater than a particular value in the first storage member and in accordance with such energy excesses and for subsequently releasing the energy, and an indicator connected to the second storage member for providing an indication in accordance with the flow of energy into and out of the second storage member.

3. In combination, means for receiving radioactive emanations and for producing signals in accordance with the emanations which it receives, a capacitance for becoming charged in accordance with the signals produced by the receiving means, control means operative to provide a low impedance during voltages greater than a particular value across the capacitance, an indicator for receiving current upon the production of a low impedance in the control means, an inductance connected in a circuit with the capacitance, the control means and the indicator for receiving energy in accordance with the flow of current from the capacitance, and unidirectional means for providing a sustained and amplified flow of current from the inductance through the indicator upon the interruption of current from the capacitance.

4. In combination, means for receiving radioactive emanations and for producing signals related to the number of radioactive emanations, a capacitance connected to the signal means for receiving a charge substantially proportionate to the signals from the signal means, control means connected to the capacitance for passing a current from the capacitance during the existence of voltages greater than a particular value across the capacitance, an inductance connected to the control means to pass a current during the existence of voltages greater than a particular value across the capacitance and to accumulate energy during the flow of such current, an indicator connected to the inductance to indicate the current passing through the inductance, and means connected to the inductance and the indicator to provide a low impedance path for producing an amplified flow of current through the indicator upon the interruption of the current through the control means and in accordance with the energy accumulated during the flow of current from the capacitance.

5. In combination, a Geiger tube for receiving radioactive emanations and for producing signals in accordance with the radioactive emanations that it receives, means for applying to the Geiger tube a voltage variable with intensity of radiation to produce a greater amplitude of response for low intensities than for high intensities, a capacitance connected to the Geiger tube to receive a charge in accordance with the signals produced by the tube, control means connected to the capacitance for providing a low impedance during the existence of charges greater than a particular value across the capacitance, an indicator, an inductance connected in a circuit with the capacitance, the control means and the indicator for receiving energy during the production of a low impedance across the control means and during the flow of current from the capacitance through the circuit, and means connected in a circuit with the inductance and the indicator to provide an amplified current through the circuit upon the interruption of current from the capacitance.

6. In combination, means for receiving radioactive emanations and for providing current pulses in accordance with such radioactive emanations, capacitive means connected to the receiving means for charging in accordance with the current pulses from the receiving means, control means connected to the capacitive means for providing a low impedance path during the existence of a voltage greater than a particular value across the capacitive means, inductive means connected to the control means for receiving energy from the capacitive means during the existence of a low impedance in the control means, indicating means connected to the inductive means to indicate the current flowing through the inductive means, and means connected to the control means to present a high impedance to the flow of current from the capacitive means and connected to the inductance to provide a low impedance path for the discharge of energy from the inductive means through the indicating means upon the interruption of current from the capacitive means.

7. In combination, means for receiving radioactive emanations and for producing current pulses in accordance with such radioactive emanations, capacitive means connected to the receiving means for charging in accordance with the current pulses produced in the receiving means, control means connected to the capacitive means for providing a low impedance path during the existence of a voltage greater than a particular value across the capacitive means, indicating means responsive to the flow of current, inductive means connected in series with the capacitive means, the control means and the indicating means for receiving energy upon the flow of current from the capacitive means during the existence of a low impedance in the control means, and unidirectional means connected to the inductive means to provide a continuous circuit including the inductive means, the indicating means and the unidirectional means for the release of energy from the inductive means upon the interruption of current from the capacitive means.

8. In combination, means including a Geiger tube for producing signals upon exposure to radioactivity and in accordance with the intensity of radioactivity, means for introducing to the signal-producing means a voltage having a particular maximum value for low intensities of radioactivity to produce a relatively large gain in the tube and for decreasing the voltage with increases in intensity of radioactivity to reduce the gain in the tube, a capacitance connected to the Geiger tube for charging in accordance with the signals produced by the tube, and means including indicating means connected to the capacitance for indicating the charge across the capacitance.

9. In combination, means including a Geiger tube for producing signals upon exposure to radioactivity and in accordance with the intensity of radioactivity, means for introducing to the Geiger tube a voltage having a particular maximum value for low intensities of radioactivity and having a value decreasing with increases in the intensity of radioactivity to produce in the tube a signal gain inversely related to the intensity of radioactivity, means for preventing the voltage from exceeding the particular maximum value to prevent an impairment in the performance characteristics of the tube, and means for providing indications of the different signal intensities produced by the first mentioned means.

10. In combination, means including a Geiger tube for producing signals upon exposure to radioactivity and in accordance with the intensity of radioactivity, means for introducing to the signal-producing means a voltage decreasing in amplitude with increases in intensity of radioactivity to provide a gain in the tube inversely dependent upon the intensity of radioactivity, an indicator having a scale with expanded calibrations relative to a linear scale for low intensities of radioactivity and with relatively contracted calibrations for increased intensities of radioactivity, and means including means saturable with increases in the amplitude of signals from the signal-producing means to provide on the scale indications corresponding to the calibrations.

11. In combination, means for producing signals upon exposure to radioactivity and in accordance with the intensity of radioactivity, means for introducing to the signal-producing means a voltage decreasing in amplitude with increases in intensity of radioactivity to provide a gain in the tube inversely dependent upon the intensity of radioactivity, an indicator having a scale with expanded calibrations relative to a linear scale for low intensities of radioactivity and with relatively contracted calibrations for increased intensities of radioactivity, means including an inductance saturable with increases in the amplitude of signals from the signal-producing means to provide on the scale indications corresponding to the calibrations, and means including the inductance and an impedance having a particular value relative to the inductance to provide for a reading by the indicator slightly greater than the maximum calibration on the indicator scale for intensities greater than that represented by the maximum calibration to indicate the relative intensity of the radioactivity and simultaneously prevent the indicator from becoming damaged.

12. In combination, means including a Geiger tube for receiving radioactive emanations and for producing signals in accordance with the number of radioactive emanations received and with the voltage applied to the tube, means for applying to the tube a voltage decreasing with increasing intensities of radioactivity to produce a decrease in the sensitivity of response with rises in the intensity of radioactivity, an indicator, and means associated with the Geiger tube and the indicator for producing in the indicator a response related to and amplified with respect to the signals produced in the Geiger tube.

13. In combination, means including a Geiger tube for receiving radioactivity and for producing signals in accordance with the intensity of radioactivity and with the voltage applied to the tube, means for applying to the tube a voltage decreasing with increasing intensities of radioactivity to produce a decrease in the sensitivity of response with increases in the intensity of radioactivity, an indicator, and means including a capacitance and a saturable reactance having an increasing impedance mismatch relative to the capacitance, the capacitance and the saturable reactance being associated with the indicator to produce in the indicator a response amplified with respect to the signals produced in the Geiger tube and having a sensitivity decreasing with increases in the intensity of radioactivity.

14. In combination, means for receiving radioactive emanations and for producing signals having characteristics related to the intensity of radioactivity, impedance means connected in a circuit with the receiving means for producing a signal in accordance with the signal produced in the receiving means, indicating means, and means connected in a circuit with the impedance means and the indicating means for controlling the flow of current from the impedance means through the indicating means and for providing a variable impedance in accordance with the flow of current to cooperate with the impedance means for the provision of a greater response of the indicating means to changes of radioactivity at low intensities of radioactivity than at high intensities of radioactivity.

15. In combination, means including a Geiger tube for producing signals upon exposure to radioactivity and in accordance with the intensity of radioactivity, a capacitance connected in a circuit with the Geiger tube for receiving charges in accordance with the signals produced in the Geiger tube, indicating means for receiving a flow of current in accordance with the charge on the capacitance, and a saturable reactance connected in a circuit with the capacitance and the indicating means for providing an impedance having a value decreasing with increasing flows of current to obtain a relative match of impedances between the capacitance and the saturable reactance at low intensities of radioactivity and a decreasing match of impedances at increasing intensities of radioactivity for a decrease in the sensitivity of response of the indicating means at increasing intensities of radioactivity.

16. In combination, means for receiving radioactive emanations and for producing signals in accordance with the number of radioactive emanations received, a capacitance for receiving the signals produced by the receiving means and for producing charges in accordance with the characteristics of the signals, indicating means, and means connected in a circuit with the capacitance and the indicating means for providing a relatively good match in impedances with the capacitance at low intensities of radioactivity and for providing an increasingly poor match in impedances at increasing intensities of radioactivity to obtain large variations in the response of the indicating means for changes in the intensity of radioactivity at low intensities of radioactivity and to obtain small variations in the response of the indicating means for changes in the intensity of radioactivity at high intensities of radioactivity.

17. In combination, means including a Geiger tube for producing signals upon exposure to radioactivity and in accordance with the intensity of radioactivity, means including a capacitance connected in a circuit with the Geiger tube for producing charges across the capacitance in accordance with the signals produced in the Geiger tube, indicating means, a saturable reactance having characteristics for providing an impedance decreasing in value with increasing amplitudes of current through the reactance and for storing increased amounts of energy at a rate decreasing in accordance with decreases in the impedance of the reactance, the reactance being connected in a circuit with the capacitance and the indicating means for receiving a flow of current in accordance with the charge in the capacitance, and unidirectional means connected in a circuit with the reactance and the indicating means for obtaining a flow of current from the reactance through the indicating means at an amplitude dependent upon the amount of energy stored in the reactance and at an amplitude considerably greater than the current from the capacitance for a response of the indicating means at a sensitivity decreasing with increasing intensities of radioactivity.

18. In combination, means including a Geiger tube for producing signals in accordance with the number of radioactive emanations penetrating the tube and in accordance with the amplitude of the voltage applied to the tube, means for applying to the Geiger tube a voltage decreasing with increasing intensities of radioactivity, a capacitance connected in a circuit with the Geiger tube for receiving charges directly related to the signals produced in the tube, an indicator, means including an inductance connected in a circuit with the capacitance and the indicator for storing an amount of energy dependent upon the charge in the capacitance above a particular value, and means including unidirectional means and the indicator for providing a release of the energy stored in the inductance upon an interruption in the flow of energy into the inductance and for providing a low impedance path for an amplified flow of current through the indicator.

19. In combination, means including a Geiger tube for producing signals in accordance with the number of radioactive emanations penetrating the tube and in accordance with the amplitude of the voltage applied to the tube, means for applying to the Geiger tube a voltage decreasing with increasing intensities of radioactivity to provide a more sensitive response of the tube to variations in the intensity of radioactivity at low intensities than at high intensities, a capacitance connected in a circuit with the Geiger tube for producing a charge having a value directly related to the signals produced in the tube, control means for providing a high impedance for voltages below a particular value and for providing a low impedance for voltages above the particular value, an indicator, a saturable reactance having characteristics for storing increasing amounts of energy at a rate decreasing with rises in current through the reactance, the reactance being connected in a series circuit with the capacitance, the control means and the indicator to receive a flow of current upon a charge in the capacitance above the particular value and in accordance with the excess in the charge above the particular value, and unidirectional means connected in a series circuit with the saturable reactance and the indicator to provide a low impedance path for the release of the stored energy in the reactance for an amplified response of the indicator and for a response having a sensitivity decreasing with increasing intensities of radioactivity.

References Cited in the file of this patent

UNITED STATES PATENTS

| | | |
|---|---|---|
| 2,620,446 | Le Vine et al. | Dec. 2, 1952 |
| 2,675,484 | Hepp | Apr. 13, 1954 |